April 30, 1946.  R. G. LE TOURNEAU  2,399,278
POWER STEERING DEVICE FOR VEHICLE COMBINATION
Filed Nov. 17, 1944   4 Sheets-Sheet 1

Inventor
R. G. LeTourneau

Patented Apr. 30, 1946

2,399,278

UNITED STATES PATENT OFFICE 2,399,278

POWER STEERING DEVICE FOR VEHICLE COMBINATIONS

Robert G. Le Tourneau, Peoria, Ill., assignor to R. G. Le Tourneau, Inc., Stockton, Calif., a corporation of California Application November 17, 1944, Serial No. 563,957

9 Claims. (Cl. 180—79.4)

This invention relates in general to a power steering device for vehicle combinations, and in particular the invention is directed to, and it is an object to provide, a novel power steering device between a tractor, especially of two-wheel type, and a trailing implement; the device being operative to cause relative steering between the tractor and trailer independently of the wheels.

An additional object of this invention is to provide a power steering device which is arranged for operative connection between the tractor adjacent the rear end thereof, and a draft member projecting forwardly from a trailing implement in rigid relation; the power steering device being operative to effect power actuated steering of the tractor relative to the trailer, while allowing of relative lateral tilting between the tractor and trailer regardless of the steering angle therebetween.

Another object of this invention is to provide a power steering device as above which comprises the sole draft coupling between the tractor and the draft member of the implement.

A further object of this invention is to provide a power steering device for the purpose described which includes a post upstanding from the tractor, means pivotally mounting said post for limited lateral tilting relative to the tractor, a sleeve turnable on the post, the draft member of the trailer being rigid relative thereto and fixed at its forward end to the sleeve, a substantially horizontal ring gear mounted on the tractor for relative rotation and surrounding the post, power means to cause relative rotation between the gear and tractor, and a universal connection between the gear and sleeve operative to maintain the same against relative rotation regardless of the tilt of the post, whereby upon relative rotation of the gear and tractor, the latter is steered relative to the trailer.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
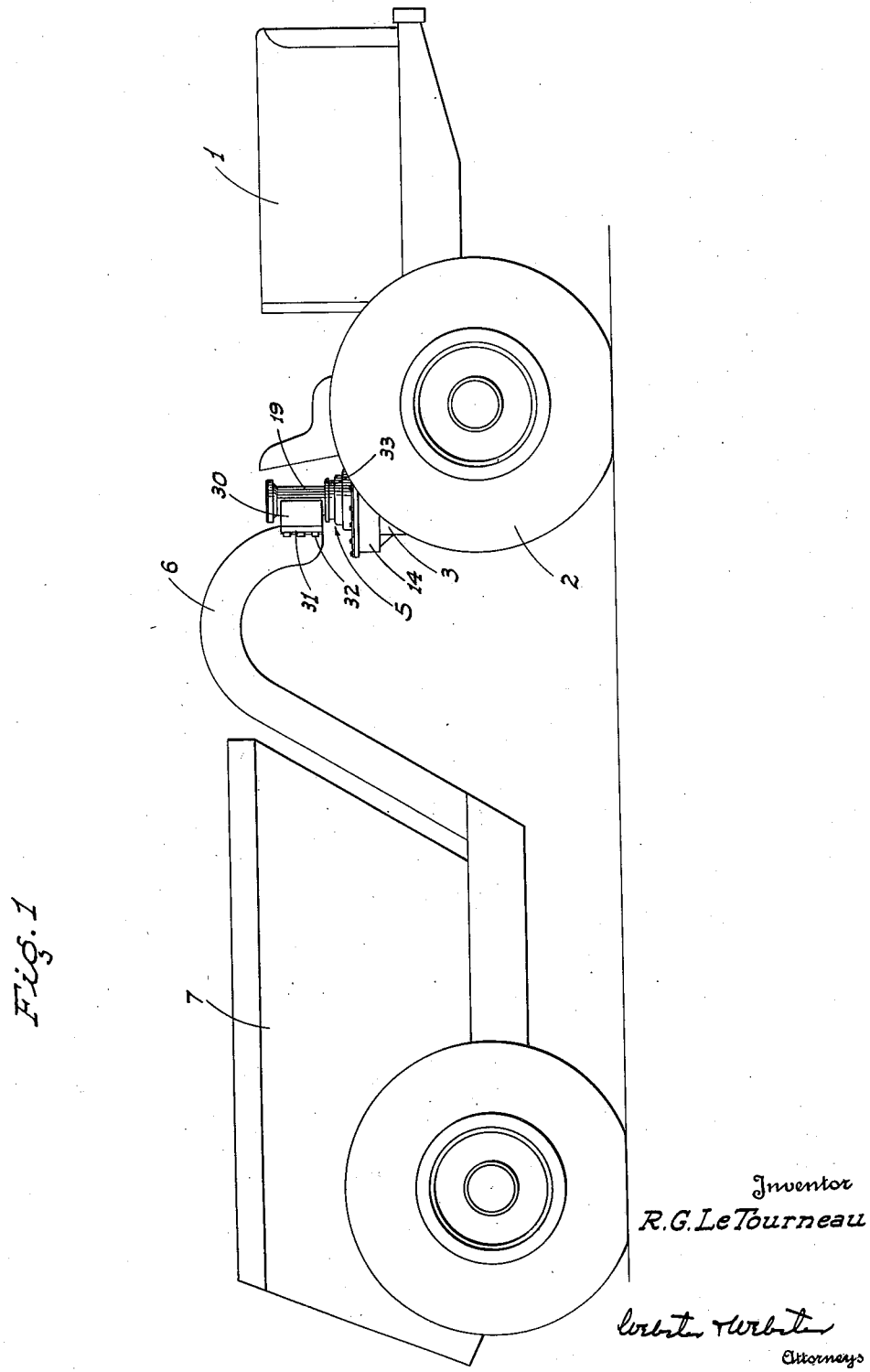
Figure 1 is a side outline of a vehicle combination incorporating the present invention.
Figure 2:
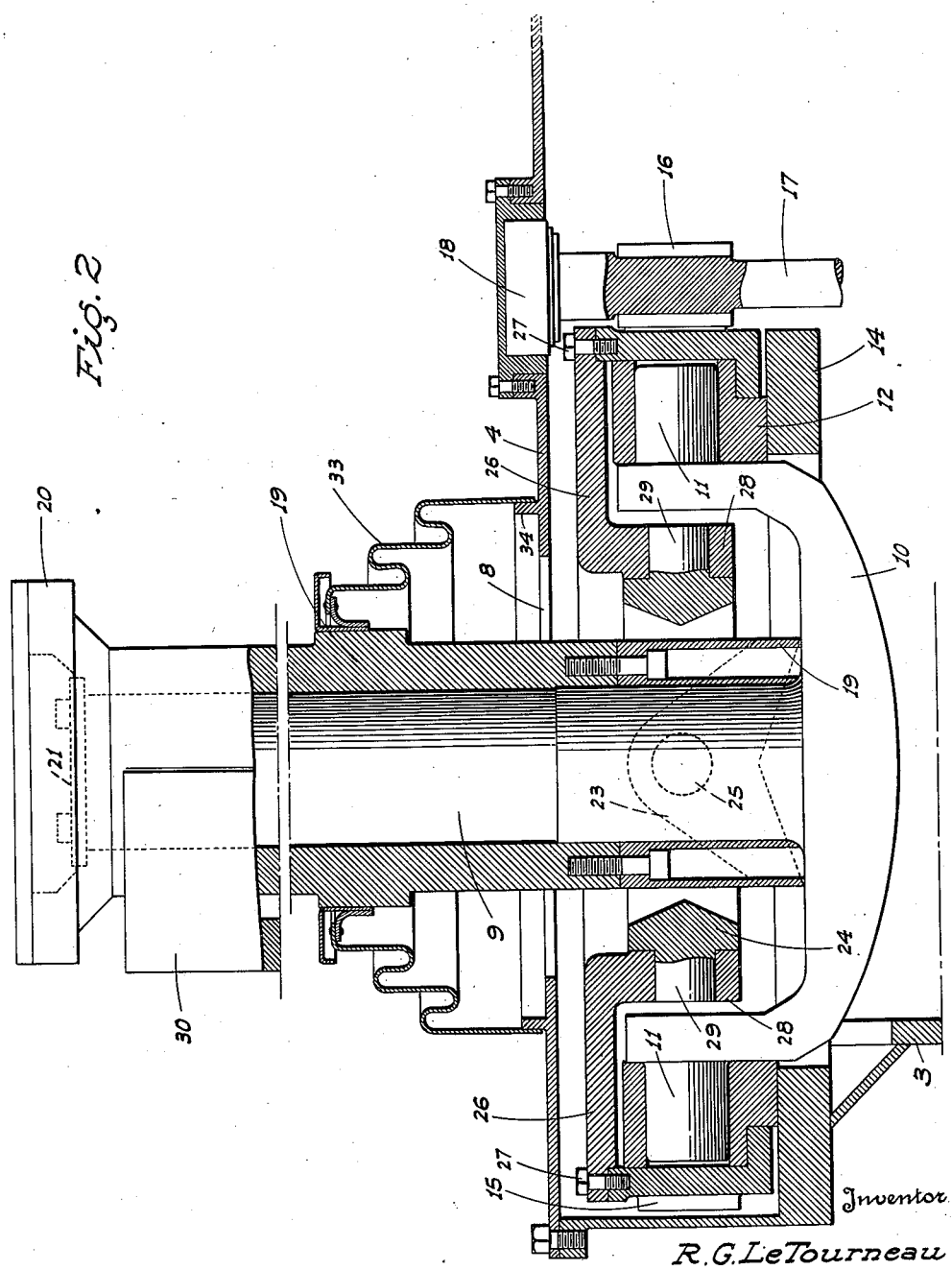
Figure 2 is a longitudinal sectional elevation of the steering device.
Figure 3:
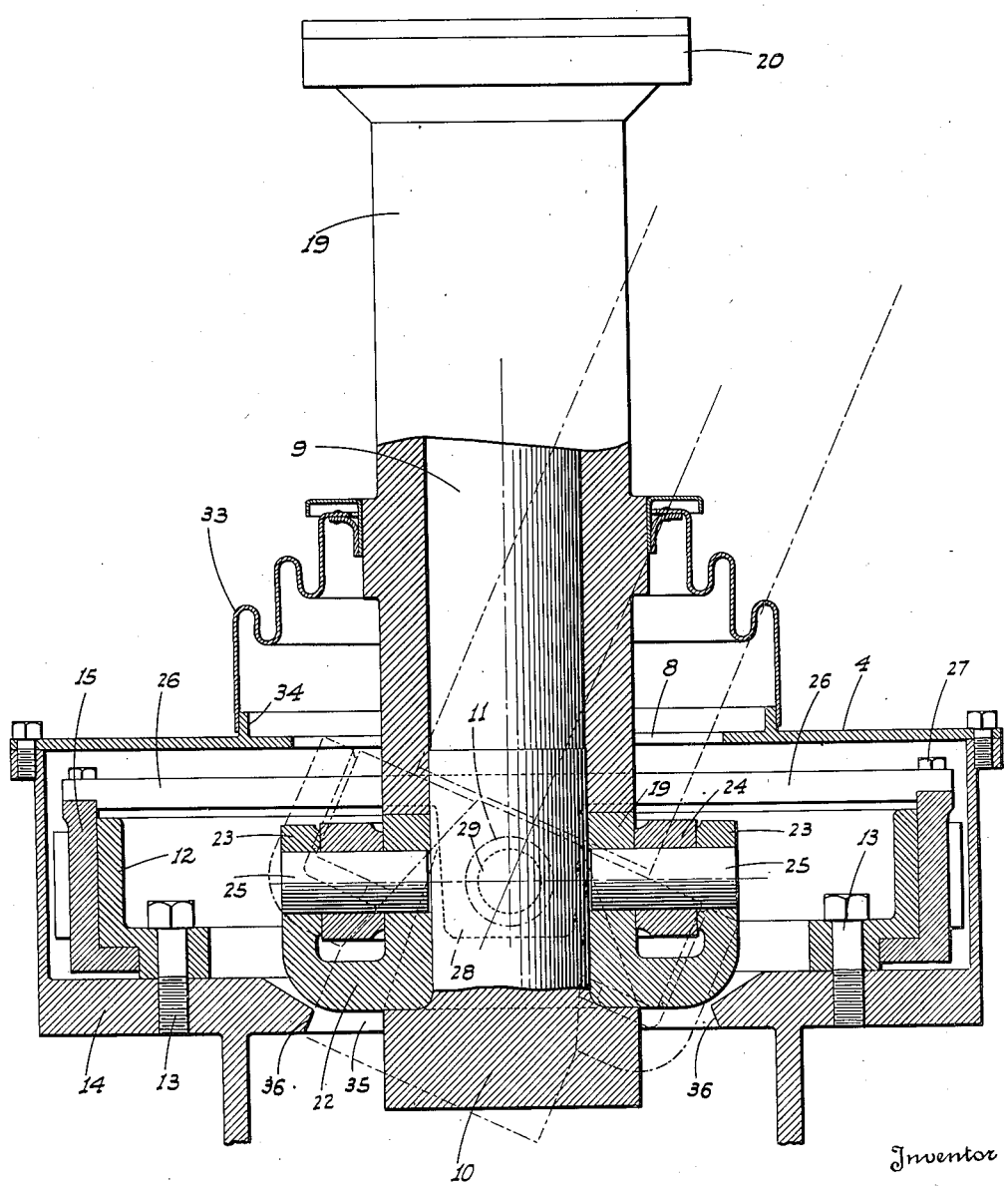
Figure 3 is a transverse sectional elevation of the device; the post and sleeve assembly being shown vertical in full lines, and in laterally tilted position in broken lines.
Figure 4:
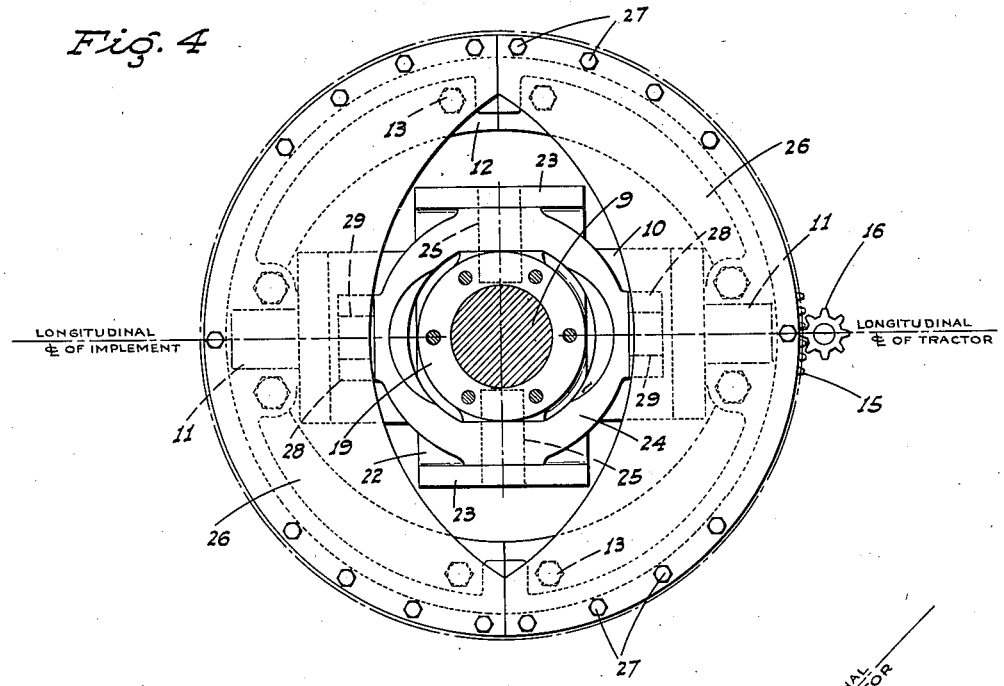
Figure 4 is a plan view of the device, with the post in section, illustrating the relative positions of the parts when the tractor and trailer are longitudinally alined.
Figure 5:
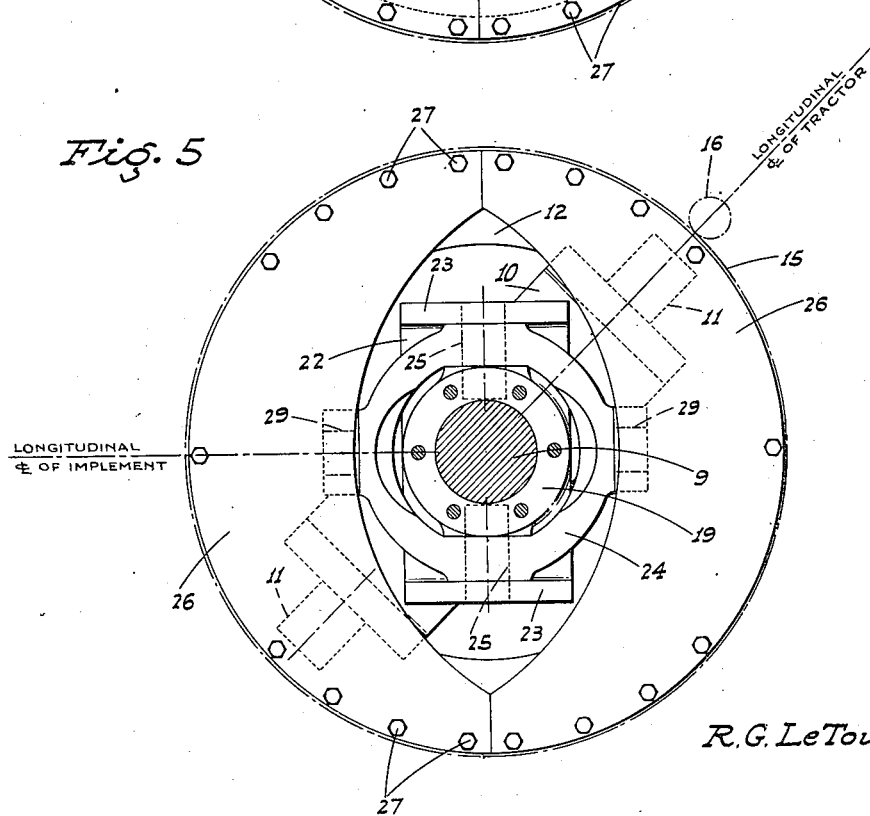
Figure 5 is a similar view but shows the relation of the parts when the tractor and trailer are relatively angled.

Referring now more particularly to the characters of reference on the drawings, the power steering device is here shown as incorporated in a vehicle combination which includes a tractor 1 of the two-wheel type having a pair of transversely spaced pneumatic tired drive wheels 2. Between the wheels 2 the tractor includes a transmission case, shown in part at 3, and which transmission case includes a horizontal top or deck 4. The power steering device, which is indicated in Fig. 1 generally at 5, is mounted in connection with the transmission case 3 and projects upwardly through the deck 4 thereof. The power steering device 5 is connected, in the manner which will hereafter appear in detail, with a forwardly projecting draft member 6, here in the form of a gooseneck, which is mounted in rigid connection with a trailing implement 7. The type of implement which comprises the trailer 7 forms no part of the present invention, and such trailing implement may be an earth carrying wagon, as here shown, a carry-type scraper, a flat bed trailer, a wheel-supported portable crane, or the like.

The power steering device, indicated generally at 5, comprises, in detail, the following structural arrangement:

The deck 4 of the tractor is formed adjacent the rear thereof with an opening 8 through which a heavy-duty upstanding steering post 9 projects from within the case 3; said post terminating at its upper end some distance above the deck 4. At its lower end the post 9 is fixed in connection with a heavy-duty upwardly opening U-shaped yoke 10 which extends lengthwise of the tractor within said case 3. The yoke 10 includes, at opposite ends thereof, trunnions 11 which project lengthwise of the tractor, said trunnions being journaled in a fixed ring 12 non-rotatably secured by bolts 13 within an upwardly opening housing 14 rigidly mounted within the case 3 below the deck 4, said deck forming a top for the housing 14.

A substantially horizontally disposed ring gear 15 is rotatably mounted on and surrounds the fixed ring 12, said gear being reversibly power driven by means of a pinion 16 on a vertical power shaft 17 which upstands alongside the gear 15 at any suitable point. At its upper end the shaft 17 is carried in a bearing 18 in the deck 4, while the shaft at its other end is reversibly driven by a manually controlled engine actuated mechanism (not shown).

A substantially full-length, two-part sleeve 19 is turnably mounted on the post 9, said sleeve terminating at its lower end at the yoke 10, and being fitted at its upper end with a head 20 against which a retaining disc 21 on the upper end of the post engages.

The reversibly driven ring gear 15 and the sleeve 19 are connected together in relatively non-rotatable relation by a universal connection assembly arranged to permit of relative lateral tilting of the post 9 about the trunnions 11 as an axis, while maintaining the relative non-rotatability between said gear and sleeve. This universal connection assembly comprises the following structure:

At the lower end the sleeve 19 is formed with a transversely extending yoke 22 which includes ears 23, which upstand from opposite ends of said yoke in clearance relation to the lower end portion of said sleeve; said ears facing at right angles to the axis of the trunnions 11. A universal ring 24 surrounds the lower end portion of the sleeve 19 between said portion and the ears 23; there being pivot pins 25 which extend from the ears 23 to the lower end portion of the sleeve through the ring 24. The pins 25 are disposed radially of the sleeve 19, and at right angles to the trunnions 11.

A centrally open, initially two-piece top plate 26 is mounted on the ring gear 15 by circumferentially spaced bolts 27; said top plate including bosses 28 which depend from said plate on opposite sides of the lower end portion of the sleeve exteriorly of the universal ring 24 and in alinement, longitudinally of the tractor, with the trunnions 11. The universal ring 24 includes trunnions 29 which turnably engage in supported relation in the bosses 28 in axial alinement with the trunnions 11.

The trunnions 11, pins 25, and trunnions 29 are all disposed in the same horizontal plane when the post 9 and sleeve 19 are vertical.

The sleeve 19, at the back thereof, is provided with a fixed rearwardly facing attachment plate 30 to which a corresponding plate 31 on the draft member 6 is fixedly secured by bolts 32. When the draft member is fixedly coupled to the power steering device 5, in the manner above described, the tractor 1 and trailer 7 are maintained substantially inflexible in a longitudinal vertical plane. However, the tractor is steerable relative to the trailer upon relative rotation of the post 9 and sleeve 19. In addition the tractor 1 and trailer 7 are capable of relative lateral tilting for the reason that the post 9 is laterally tiltable relative to the tractor about the trunnions 11 as an axis.

When it is desired to steer the tractor relative to the trailer, the shaft 17 is driven in one direction or the other under the manual control of the operator. This causes a relative rotation between the shaft driven pinion 16 and the ring gear 15, and consequently—through the universal connection assembly—produces relative rotation between the post 9 and sleeve 19 and steering of the tractor relative to the trailer. During a steering operation the gear 15 does not actually rotate, but remains stationary with the sleeve 19 and connected draft member 6; the tractor case 3, together with the post 9, being the parts which actually rotate, and the pinion 16 traveling about said gear 15.

By reason of the described universal connection assembly between the ring gear 15 and the sleeve 19, steering of the tractor can be accomplished regardless of the relative lateral tilt between the tractor and trailer.

In order to prevent access of dust and foreign matter into the working parts of the device a dust seal 33 of flexible accordian type extends between the sleeve 19, and an annular flange 34 on the deck 4 about the opening 8.

The relative lateral tilting movement of the post and sleeve assembly, and consequently the relative lateral tilting between the tractor and trailer, is limited as follows: The yoke 10 depends through a bottom opening 35 in the housing 14 and is normally clear thereof. However, at a predetermined angle of lateral tilt of the post and sleeve assembly in either direction, the yoke engages one of a pair of abutments 36 formed on said bottom of housing 14 on opposite sides of opening 35.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. Driving mechanism for a tractor-trailer draft coupling and power steering device which includes an upstanding member fixed relative to the trailer and mounted on the tractor in rotatable and laterally tiltable relation; said driving mechanism comprising a driven rotary member mounted on the tractor in a fixed position separate from said upstanding member but turnable about the axis thereof, and a universal connection assembly coupling the rotary member and the upstanding member together, said universal connection assembly being arranged to maintain said members against relative rotation while allowing of relative lateral tilting of the upstanding member.

2. Driving mechanism for a tractor-trailer draft coupling and power steering device which includes an upstanding post mounted on the tractor for relative lateral tilting movement, and a member fixed relative to the trailer and mounted on the post for rotation thereabout; said driving mechanism being arranged to cause relative steering rotation between the tractor and said member, and comprising a ring gear rotatably mounted on the tractor and extending about the post, means to reversibly drive said gear, and a universal connection assembly connecting the member to the gear in non-rotatable but laterally tiltable relation.

3. Driving mechanism for a tractor-trailer draft coupling and power steering device which includes an upstanding post mounted on the tractor for relative lateral tilting movement, and a sleeve fixed relative to the trailer and mounted on the post for rotation thereabout; said driving mechanism comprising a reversibly driven rotary member surrounding the post and sleeve assembly, and a universal connection assembly connecting the rotary member and sleeve against relative rotation without limiting lateral tilting of the post and sleeve assembly.

4. Driving mechanism for a tractor-trailer draft coupling and power steering device which includes an upstanding post mounted on the tractor for relative lateral tilting movement, and a sleeve fixed relative to the trailer and mounted on the post for rotation thereabout; said driving mechanism comprising a substantially horizontal, reversibly power driven ring gear mounted on the tractor about the post and sleeve assembly, opposed trunnion receiving bosses fixed in connection with the ring gear within the latter, the axes of said bosses being alined and at right angles to the axis of the ring gear, a universal ring disposed within the ring gear and extending about the post and sleeve assembly in clearance relation to the latter, opposed outwardly projecting trunnions on the universal ring journaled in said bosses, and other opposed trunnions projecting inwardly from the universal ring and journaling the latter to the sleeve 90° apart from said outwardly projecting trunnions.

5. Driving mechanism for a tractor-trailer draft coupling and power steering device which includes an upstanding cylindrical post, a tubular sleeve fixed relative to the trailer and surrounding the post in rotatable but axially immovable relation, an upwardly opening, substantially U-shaped yoke fixed intermediate its ends on the lower end of the post and extending lengthwise of the tractor, and opposed and alined end trunnions journaling the yoke on the tractor for lateral tilting movement of the post and sleeve assembly; said driving mechanism comprising a ring gear surrounding the lower end portion of the post and sleeve assembly and mounted for relative rotation on the tractor in a substantially horizontal plane, opposed trunnion receiving bosses fixed in connection with the ring gear and depending within the yoke, the axes of said bosses being alined and disposed at right angles to the axis of the ring gear, a universal ring disposed within the yoke inwardly of said bosses and extending about the post and sleeve assembly in clearance relation to the latter, opposed outwardly projecting trunnions on the universal ring journaled in said bosses, and other opposed trunnions projecting inwardly from the universal ring and journaling the latter to the sleeve 90° apart from said outwardly projecting bosses.

6. A driving mechanism as in claim 5 in which the yoke trunnions, outwardly projecting universal ring trunnions, and inwardly projecting universal ring trunnions are all in the same horizontal plane when the post is vertical.

7. In the combination of a tractor and a tractor-trailer draft coupling and power steering device wherein said device includes an upstanding post mounted on the tractor adjacent the rear end for relative lateral tilting movement, a sleeve fixed relative to the trailer and rotatably mounted on the post, and power driven means arranged to cause relative rotation between the post and sleeve regardless of the lateral tilt of the post; the tractor including a case having a top opening, the post and sleeve assembly projecting upwardly through the opening, and a flexible, dust seal between the sleeve and case about said opening.

8. In the combination of a tractor and a tractor-trailer draft coupling and power steering device wherein said device includes a post mounted on the tractor for relative lateral tilting, a sleeve turnably mounted on the post, and power actuated means connected between the tractor and sleeve operative to cause relative rotation between the sleeve and post regardless of the lateral tilt thereof; the tractor including a case adjacent its rear end, said case having a top opening, the post and sleeve assembly being mounted in the case and projecting upwardly through said opening to a termination thereabove, said sleeve being fixed relative to the trailer outside the case, and said power actuated means being connected between the tractor and sleeve within the case.

9. Driving mechanism for a tractor-trailer draft coupling and power steering device which includes an upstanding member fixed relative to the trailer and mounted on the tractor in rotatable and laterally tiltable relation; said driving mechanism comprising a driven rotary member mounted on the tractor about said upstanding member, and a universal connection assembly coupling the rotary member and the upstanding member together; said universal connection assembly being arranged to maintain said members against relative rotation, while allowing of relative lateral tilting of the upstanding member, and said rotary member being a driven ring gear.

ROBERT G. LE TOURNEAU.